(12) United States Patent
Bao et al.

(10) Patent No.: US 10,396,403 B2
(45) Date of Patent: Aug. 27, 2019

(54) ELECTROCHEMICAL ENERGY STORAGE DEVICE

(71) Applicants: DONGGUAN AMPEREX TECHNOLOGY LIMITED, Dongguan (CN); NINGDE AMPEREX TECHNOLOGY LIMITED, Ningde (CN)

(72) Inventors: Jinzhen Bao, Dongguan (CN); Honggang Yu, Dongguan (CN); Hongxin Fang, Dongguan (CN); Chao Yang, Dongguan (CN); Zheng Cao, Dongguan (CN)

(73) Assignees: DONGGUAN AMPEREX TECHNOLOGY LIMITED, Dongguan, Guangdong Province (CN); NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 178 days.

(21) Appl. No.: 15/608,798

(22) Filed: May 30, 2017

(65) Prior Publication Data

US 2017/0263983 A1  Sep. 14, 2017

Related U.S. Application Data

(63) Continuation of application No. PCT/CN2015/080758, filed on Jun. 4, 2015.

(30) Foreign Application Priority Data

Dec. 8, 2014  (CN) .......................... 2014 1 0747997

(51) Int. Cl.
*H01M 10/05* (2010.01)
*H01M 2/02* (2006.01)
(Continued)

(52) U.S. Cl.
CPC ..... *H01M 10/0587* (2013.01); *H01M 2/0287* (2013.01); *H01M 2/0292* (2013.01);
(Continued)

(58) Field of Classification Search
None
See application file for complete search history.

(56) References Cited

U.S. PATENT DOCUMENTS

2006/0093922 A1* 5/2006 Kim .................... H01M 2/0275
429/251
2010/0291432 A1  11/2010 Kim
(Continued)

FOREIGN PATENT DOCUMENTS

| CN | 102549801 A | 7/2012 |
| CN | 203690420 U | 7/2014 |
| KR | 20110075583 A | 7/2011 |

OTHER PUBLICATIONS

Dongguan Amperex Technology Limited, Extended European Search Report, EP15867312.9, dated Jun. 19, 2018, 8 pgs.

*Primary Examiner* — Scott J. Chmielecki
(74) *Attorney, Agent, or Firm* — Morgan, Lewis & Bockius LLP

(57) ABSTRACT

The present disclosure provides an electrochemical energy storage device, which comprises a cell, an electrolyte and a package. The electrochemical energy storage device further comprises a binding material positioned between the cell and the package. The binding material comprises an adhesive layer and a covering layer. The adhesive layer is directly or indirectly adhered and positioned on an outer surface of the cell, and a surface of the adhesive layer which is far away from the cell is an adhesive surface; the covering layer is positioned on the adhesive surface of the adhesive layer, the covering layer is dissolved or swollen into the electrolyte in whole or in part so as to expose the adhesive surface of the
(Continued)

adhesive layer, therefore the adhesive layer can make the cell adhered with the package. The covering layer is a polar molecule, the polar molecule comprises one or more selected from the group consisting of —F, —CO—NH—, —NH—CO—NH—, and —NH—CO—O—. The electrochemical energy storage device of the present disclosure may not only fixedly connect the cell to the package so as to resolve the problems during the drop test, but also may resolve the problem that the cell is difficult to put into the package because the two surfaces of the binding material are both adhesive, the electrochemical energy storage device also has an excellent cycle performance and an excellent charge-discharge performance under a high rate.

12 Claims, 2 Drawing Sheets

(51) Int. Cl.
    *H01M 10/0587*      (2010.01)
    *H01M 2/10*      (2006.01)
    *H01M 10/058*      (2010.01)
    *H01M 2/16*      (2006.01)
    *H01M 10/056*      (2010.01)
    *H01M 10/44*      (2006.01)
    *H01M 2/08*      (2006.01)
    *H01M 10/04*      (2006.01)
    *H01M 10/0563*      (2010.01)
    *C09J 107/00*      (2006.01)
    *C09J 109/00*      (2006.01)

(52) U.S. Cl.
    CPC ............... *H01M 2/08* (2013.01); *H01M 2/10* (2013.01); *H01M 2/168* (2013.01); *H01M 10/0431* (2013.01); *H01M 10/056* (2013.01); *H01M 10/058* (2013.01); *H01M 10/0563* (2013.01); *H01M 10/44* (2013.01); *C09J 107/00* (2013.01); *C09J 109/00* (2013.01); *C09J 2433/00* (2013.01)

(56) References Cited

U.S. PATENT DOCUMENTS

| | | | | |
|---|---|---|---|---|
| 2011/0217589 | A1* | 9/2011 | Kobayashi | H01M 2/02 429/174 |
| 2011/0287302 | A1* | 11/2011 | Kim | H01M 2/022 429/163 |
| 2016/0268625 | A1* | 9/2016 | Choi | H01M 10/058 |

* cited by examiner

ELECTROCHEMICAL ENERGY STORAGE DEVICE

CROSS-REFERENCE TO RELATED APPLICATIONS

This application is a continuation of PCT/CN2015/080758, filed on Jun. 4, 2015, which claims priority to Chinese Patent Application Serial No. 201410747997.7, filed Dec. 8, 2014, all of which are incorporated herein by reference in their entirety.

FIELD OF THE PRESENT DISCLOSURE

The present disclosure relates to a technology field of electrochemistry, and particularly relates to an electrochemical energy storage device.

BACKGROUND OF THE PRESENT DISCLOSURE

Due to advantages, such as a high operating voltage, a small volume, a light weight, a high specific capacity, non-memory effect, non-pollution, a small self-discharge and a long cycle life, a lithium-ion secondary battery has been widely applied in various fields, such as communication, electrical appliance, electronic information, power device, storage device and the like, and as the society develops rapidly, people present higher requirements on the lithium-ion secondary battery in energy density, charge-discharge rate, cycle life and safety performance.

Drop test is a relatively strict safety test of the lithium-ion secondary battery. Problems, that top sealing is burst out, electrolyte is leaked, separator wrinkles, internal short circuit is established, tab is broken, and so on, easily occur when the lithium-ion secondary battery is dropped. At present, using an adhesive tape to tie a cell up or enlarging a region for the top sealing may resolve the problems, that top sealing is burst out, electrolyte is leaked and tab is broken and the like, but the above two methods will decrease the energy density of the lithium-ion secondary battery, and cannot resolve the problems that separator shrinks and wrinkles and internal short circuit is established and the like when the lithium-ion secondary battery is dropped. By adhering the conventional double-sided adhesive tape to a position between the cell and a package may resolve the above problems when the lithium-ion secondary battery is dropped, but because the two surfaces of the adhesive tape are both adhesive, when the cell is put into the package, the adhesive tape will be adhered with the package, thereby increasing the difficulty to put the cell into the package (that is the cell enters into the package).

SUMMARY OF THE PRESENT DISCLOSURE

In view of the problems existing in the background of the present disclosure, an object of the present disclosure is to provide an electrochemical energy storage device, the electrochemical energy storage device may not only fixedly connect the cell to the package so as to resolve the problems during the drop test, but also may resolve the problem that the cell is difficult to put into the package because the two surfaces of the binding material are both adhesive, the electrochemical energy storage device also has an excellent cycle performance and an excellent charge-discharge performance under a high rate.

In order to achieve the above object, the present disclosure provides an electrochemical energy storage device, which comprises a cell, an electrolyte and a package. The cell comprises a positive electrode plate, a negative electrode plate and a separator positioned between the positive electrode plate and the negative electrode plate; the electrolyte immerses the cell; the package accommodates the cell and the electrolyte. The electrochemical energy storage device further comprises a binding material positioned between the cell and the package. The binding material comprises an adhesive layer and a covering layer. The adhesive layer is directly or indirectly adhered and positioned on an outer surface of the cell, and a surface of the adhesive layer which is far away from the cell is an adhesive surface; the covering layer is positioned on the adhesive surface of the adhesive layer, the covering layer is dissolved or swollen into the electrolyte in whole or in part so as to expose the adhesive surface of the adhesive layer, therefore the adhesive layer can make the cell adhered with the package. The covering layer is a polar molecule, the polar molecule comprises one or more selected from the group consisting of —F, —CO—NH—, —NH—CO—NH—, and —NH—CO—O—.

The present disclosure has following beneficial effects in comparison with the prior art:

1. Before the covering layer is dissolved or swollen into the electrolyte in whole or in part so as to be removed, the adhesive layer of the binding material of the present disclosure will not be adhered with the package, thereby resolving the problem that the cell is difficult to put into the package because the two surfaces of the binding material are both adhesive.

2. The covering layer of the binding material of the present disclosure is a polar molecular, and is easily formed into a network structure, therefore the covering layer can absorb the redundant electrolyte in the electrochemical energy storage device so as to improve the electrolyte expansion, meanwhile, the electrolyte in the electrochemical energy storage device is gradually decreased as a result of electrolyte decomposition after repeated cycles, the electrolyte absorbed by the covering layer can be gradually released into the electrochemical energy storage device under a concentration difference, so as to improve the long-term cycle performance of the electrochemical energy storage device.

3. The covering layer of the binding material of the present disclosure is dissolved or swollen into the electrolyte in whole or in part so as to generate adhesiveness and diffused into the electrochemical energy storage device along with the electrolyte, thereby making the separator adhered with the electrode plate, preventing the separator from being shrank when the electrochemical energy storage device is dropped, meanwhile inhibiting the deformation of the electrode plate after repeated cycles which is cause by expansion of the electrode plate.

4. The covering layer of the present disclosure has a higher molecular polarity, which is beneficial to the ionization of the lithium salt, therefore it can improve the ion-conducting ability of the electrolyte, and improve the charge-discharge performance under a high rate of the electrochemical energy storage device.

Figure 1:
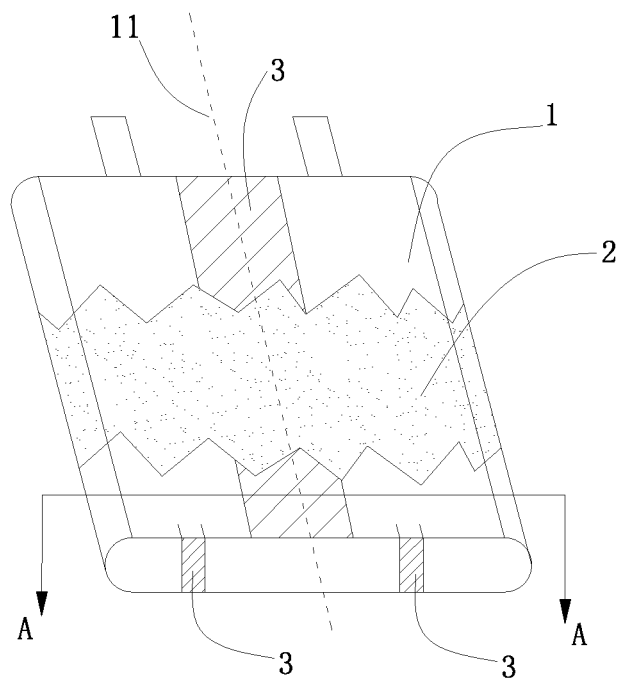
FIG. 1 is a partial sectional view illustrating an electrochemical energy storage device of an embodiment of the present disclosure.

Reference numerals are represented as follows:
1 cell
11 ending
2 package
3 binding material
31 adhesive layer
32 covering layer
4 adhesive tape

DETAILED DESCRIPTION

Hereinafter an electrochemical energy storage device and examples, comparative examples and testing processes and testing results according to the present disclosure will be described in detail.

Figure 2:
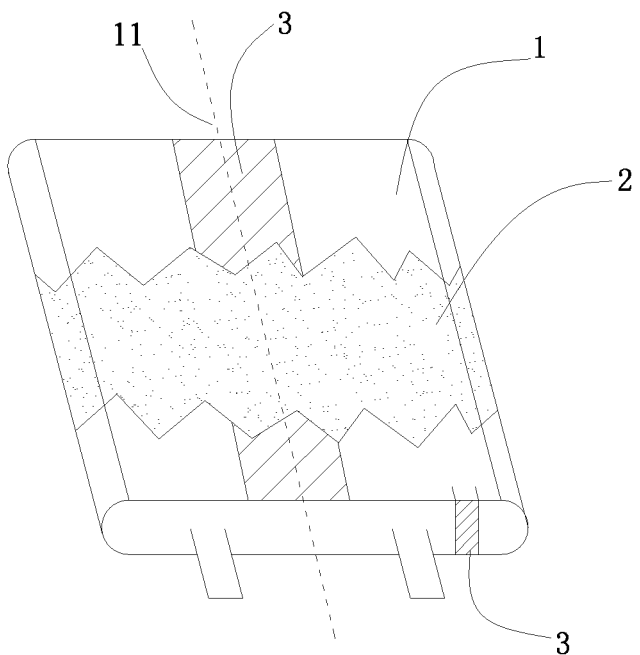
FIG. 2 is a partial sectional view illustrating an electrochemical energy storage device of another embodiment of the present disclosure.
Figure 3:
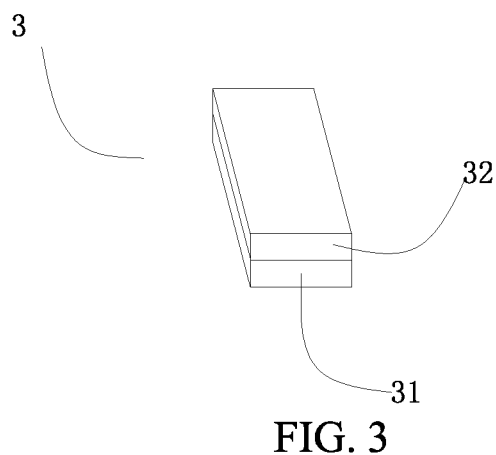
FIG. 3 is a schematic view illustrating a configuration of an embodiment of a binding material of the electrochemical energy storage device of the present disclosure.

Referring to FIG. 1 to FIG. 3, firstly, an electrochemical energy storage device according to the present disclosure will be described, the electrochemical energy storage device comprises a cell 1, an electrolyte and a package 2. The cell 1 comprises a positive electrode plate, a negative electrode plate and a separator positioned between the positive electrode plate and the negative electrode plate; the electrolyte immerses the cell 1; the package 2 accommodates the cell 1 and the electrolyte. The electrochemical energy storage device further comprises a binding material 3 positioned between the cell 1 and the package 2. The binding material 3 comprises an adhesive layer 31 and a covering layer 32. The adhesive layer 31 is directly or indirectly adhered and positioned on an outer surface of the cell 1, and a surface of the adhesive layer 31 which is far away from the cell 1 is an adhesive surface; the covering layer 32 is positioned on the adhesive surface of the adhesive layer 31, the covering layer 32 is dissolved or swollen into the electrolyte in whole or in part so as to expose the adhesive surface of the adhesive layer 31, therefore the adhesive layer 31 can make the cell 1 adhered with the package 2. The covering layer 32 is a polar molecule, the polar molecule comprises one or more selected from the group consisting of —F, —CO—NH—, —NH—CO—NH—, and —NH—CO—O—.

In an example, when the covering layer 32 is dissolved or swollen into the electrolyte in whole or in part so as to expose the adhesive surface of the adhesive layer 31, the package 2 may be processed under pressing or heating from outside, therefore the adhesive layer 31 can make the cell 1 adhered with the package 2.

In the electrochemical energy storage device according to the present disclosure, the covering layer 32 may be one or more selected from the group consisting of polar fluorinated polyolefin, polar fluorinated polyester, polar fluororubber, polyamide and polyurethane.

In the electrochemical energy storage device according to the present disclosure, the polar fluorinated polyolefin may be one or more selected from the group consisting of polyvinylidene fluoride (PVDF), polyacrylic acid modified polyvinylidene fluoride, fluorinated polypropylene (FPP), vinylidene fluoride-hexafluoropropylene copolymer (fluororubber 26), tetrafluoroethylene-propylene copolymer (fluororubber TP), fluoroalkene-vinyl ether copolymer (FEVE), vinylidene fluoride-tetrafluoroethylene-hexafluoropropylene copolymer (VDF-TFE-HEP), and tetrafluoroethylene-propylene rubber.

In the electrochemical energy storage device according to the present disclosure, the polar fluorinated polyester may be one or more selected from the group consisting of fluorinated polyurethane, linear fluorinated poly(butylene isophthalate) (FPBI), linear fluorinated poly(butylene terephthalate) (FPBT), hydroxyl terminated polyester polysiloxane containing fluorine, and hyperbranched polyhydroxy fluorinated polyester (HBFP).

In the electrochemical energy storage device according to the present disclosure, the polar fluororubber may be one or more selected from the group consisting of hydroxyl nitroso fluororubber, and fluoro ether rubber (VITON® GLT).

In the electrochemical energy storage device according to the present disclosure, the polyamide may be one or more selected from the group consisting of polydecamrthylene sebacamide, polyundecaneamid, and polydodecanamide.

In the electrochemical energy storage device according to the present disclosure, the polyurethane is generated by the reaction of polyhydric alcohol containing double bond, diisocyanate and chain extension agent. The polyhydric alcohol containing double bond may be one or more selected from the group consisting of poly hexalene glycol, poly propylene glycol, polytetramethylene ether glycol, and polycaprolactone oxydiethylene ester. The diisocyanate may be one or more selected from the group consisting of diphenylmethane-diisocyanate, lysine diisocyanate, 4,4'-methylene dicyclohexyl diisocyanate, and 2,4,6-triisopropylphenyl diisocyanate. The chain extension agent may be one or more selected from the group consisting of 1,6-hexanediamine, 1,4-butylenediamine, 1,2-diaminopropane, and bis(aminomethyl)benzene.

In the electrochemical energy storage device according to the present disclosure, the polyurethane may be fluorinated polyurethane.

In the electrochemical energy storage device according to the present disclosure, the electrochemical energy storage device may be one selected from a group consisting of lithium secondary battery, lithium-ion secondary battery, super capacitor, fuel cell and solar battery.

In the electrochemical energy storage device according to the present disclosure, the cell 1 may be a wound cell, a laminated cell, or a laminated-wound cell.

In the electrochemical energy storage device according to the present disclosure, the binding material 3 may be provided at any position between the cell 1 and the package 2. For example, the binding material 3 may be adhered and positioned at an ending 11 of the wound cell 1, or the binding material 3 may be adhered and positioned at any position of the outer surface of the cell 1 facing the package 2, the binding materials 3 may be adhered and positioned at a position perpendicular to the width direction of the cell 1 and across and surrounding the top and the bottom of the cell 1 respectively, and any edge or corner of the cell 1 may be adhered with the binding material 3, or several positions each may be adhered with the binding material 3 at the same time. An area of the binding material 3 may be not more than a surface area of the cell 1, a shape of the binding material 3 may be one or more selected from the group consisting of rectangular shape, circular shape, diamond shape, triangular shape, annular shape, gyrose shape, porous shape and the like.

In the electrochemical energy storage device according to the present disclosure, the package 2 may be a soft package or a hard package.

Figure 4:
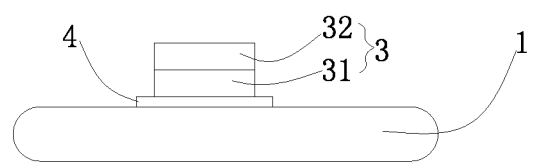
FIG. 4 is a schematic view exaggeratedly illustrating a configuration of yet another embodiment of the electrochemical energy storage device of the present disclosure taken along a line A-A of FIG. 1.

In the electrochemical energy storage device according to the present disclosure, referring to FIG. 4, the electrochemical energy storage device may further comprise an adhesive tape 4 having single adhesive surface or double adhesive surfaces, positioned between the cell 1 and the binding material 3, one adhesive surface of the adhesive tape 4 is adhered and positioned on the outer surface of the cell 1 and the other surface of the adhesive tape 4 is adhered and connected to the binding material 3 so as to make the binding material 3 indirectly adhered and positioned on the outer surface of the cell 1.

In the electrochemical energy storage device according to the present disclosure, a base material of the adhesive tape 4 may be one or more selected from the group consisting of polyethylene terephthalate (PET), oriented polypropylene (PP) and polyimide (PI); an adhesive of the adhesive tape 4 may be one or more selected from the group consisting of acrylic resin adhesive, thermosetting polyurethane adhesive, silicone adhesive, natural rubber and synthetic rubber.

In the electrochemical energy storage device according to the present disclosure, a thickness of the adhesive tape 4 may be 3 μm~20 μm.

In the electrochemical energy storage device according to the present disclosure, a thickness of the adhesive layer 31 may be 3 μm~40 μm.

In the electrochemical energy storage device according to the present disclosure, the adhesive layer 31 may be one or more selected from the group consisting of temperature sensitive adhesive and pressure sensitive adhesive.

In the electrochemical energy storage device according to the present disclosure, the temperature sensitive adhesive may be one or more selected from the group consisting of terpene resin, petroleum resin, naphthenic oil, polyolefine, polyvinyl butyral, polyamide, ethylene-vinyl acetate copolymer (EVA), styrene-isoprene-styrene block copolymer (SIS) and polyester, the naphthenic oil cannot be used independently.

In the electrochemical energy storage device according to the present disclosure, the pressure sensitive adhesive may be one or more selected from the group consisting of ethylene-butylene-styrene linear triblock copolymer (SEBS), styrene-butadiene block copolymer (SEPS), epoxidized styrene-isoprene-styrene block copolymer (ESIS), acrylic resin adhesive, thermosetting polyurethane adhesive, silicone adhesive, natural rubber and synthetic rubber.

In the electrochemical energy storage device according to the present disclosure, the adhesive layer 31 may have flowability.

In the electrochemical energy storage device according to the present disclosure, the adhesive layer 31 may further comprise an inorganic additive, the inorganic additive may be one or more selected from the group consisting of $Al_2O_3$ and $SiO_2$.

In the electrochemical energy storage device according to the present disclosure, a thickness of the covering layer 32 may be 2 μm~20 μm.

In the electrochemical energy storage device according to the present disclosure, the use of the inorganic additive may effectively control the adhesiveness of the adhesive layer 31, the binding material 3 will not flow to a sealing edge of the cell 1 under pressing or heating, thereby resolving the problem of poor sealing caused by the inhomogeneous flow of the binding material 3.

Then examples and comparative examples of electrochemical energy storage devices according to the present disclosure would be described, the first binding material and the second binding material were two different types of the binding material 3 of the present disclosure.

EXAMPLE 1

1. Preparation of a positive electrode plate: $LiCoO_2$, conductive carbon and polyvinylidene fluoride according to a weight ratio of 96:1:3 were uniformly mixed with N-methyl pyrrolidone to form a positive electrode slurry, then the positive electrode slurry was coated and pressed to form a positive electrode plate with a thickness of 100 μm.

2. Preparation of a negative electrode plate: graphite, conductive carbon, sodium carboxymethyl cellulose and styrene butadiene rubber according to a weight ratio of 97:1:1:1 were uniformly mixed with deionized water to form a negative electrode slurry, then the negative electrode slurry was coated and pressed to form a negative electrode plate with a thickness of 90 μm.

3. Preparation of an electrolyte: EC, PC, DEC and EMC according to a weight ratio of 20:20:50:10 were uniformly mixed to form a non-aqueous organic solvent, $LiPF_6$ (lithium salt) was added with a concentration of 1.0 mol/L, finally an electrolyte was completed.

4. Preparation of a cell: the prepared positive electrode plate, a PP separator and the negative electrode plate were wound together to form a wound cell with a thickness of 3.5 mm, a width of 48 mm and a length of 80 mm.

5. Preparation of a binding material: a length of the binding material was 75 mm, and a width of the binding material was 8 mm; the adhesive layer was a mixture of polybutylene (PB) and terpene resin, a thickness of the adhesive layer was 20 μm, the covering layer was PVDF, a thickness of the covering layer was 3 μm.

6. Preparation of a lithium-ion secondary battery: the adhesive layer of the binding material was directly adhered at an ending of the wound cell, and then the wound cell was put into a package, the electrolyte was injected, then at 60° C., a 1 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 2

The lithium-ion secondary battery was prepared the same as that in example 1 except the following:

5. Preparation of a binding material: the covering layer was PVDF, a thickness of the covering layer was 20 μm.

EXAMPLE 3

The lithium-ion secondary battery was prepared the same as that in example 1 except the following:

5. Preparation of a binding material: the covering layer was FPP, a thickness of the covering layer was 3 μm.

EXAMPLE 4

The lithium-ion secondary battery was prepared the same as that in example 1 except the following:

5. Preparation of a binding material: the covering layer was FPBI, a thickness of the covering layer was 3 μm.

EXAMPLE 5

The lithium-ion secondary battery was prepared the same as that in example 1 except the following:

5. Preparation of a Binding Material

1) Binding material: a length of the binding material was 75 mm, and a width of the binding material was 8 mm; the adhesive layer was a mixture of polybutylene (PB) and terpene resin, a thickness of the adhesive layer was 20 μm, the covering layer was FPBI, a thickness of the covering layer was 3 μm.

2) Green glue tape: a length of the green glue tape was 75 mm, a width of the green glue tape was 8 mm, the green glue tape comprised polyethylene terephthalate (PET) as the base material and acrylic resin as the adhesive, the acrylic resin was coated on one surface of the polyethylene terephthalate (PET), a thickness of the polyethylene terephthalate (PET) was 7 μm, a thickness of the acrylic resin was 8 μm.

6. Preparation of a lithium-ion secondary battery: the adhesive layer of the binding material was directly adhered at an opposite surface of the ending of the wound cell, one green glue tape was adhered at the ending of the cell, and then the wound cell was put into a package, the electrolyte was injected, then at 60° C., a 1 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 6

The lithium-ion secondary battery was prepared the same as that in example 1 except the following:

6. Preparation of a lithium-ion secondary battery: the adhesive layer of the binding material was directly adhered at an ending of the wound cell, and then the wound cell was put into a package, the electrolyte was injected, then at 25° C., a 1 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 7

The lithium-ion secondary battery was prepared the same as that in example 1 except the following:

5. Preparation of a binding material: the adhesive layer was a mixture of SIS and terpene resin, a thickness of the adhesive layer was 20 μm.

6. Preparation of a lithium-ion secondary battery: the adhesive layer of the binding material was directly adhered at an ending of the wound cell, and then the wound cell was put into a package, the electrolyte was injected, then at 85° C., a 1 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 8

The lithium-ion secondary battery was prepared the same as that in example 7 except the following:

5. Preparation of a binding material: the adhesive layer was a mixture of SIS and terpene resin, the adhesive layer further comprised an inorganic additive $Al_2O_3$, a thickness of the adhesive layer was 40 μm.

EXAMPLE 9

The lithium-ion secondary battery was prepared the same as that in example 1 except the following:

6. Preparation of a lithium-ion secondary battery: the adhesive layer of the binding material was directly adhered at an ending of the wound cell, and then the wound cell was put into a package, the electrolyte was injected, then at 25° C., a 0.2 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 10

The lithium-ion secondary battery was prepared the same as that in example 1 except the following:

6. Preparation of a lithium-ion secondary battery: the adhesive layer of the binding material was directly adhered at an ending of the wound cell, and then the wound cell was put into a package, the electrolyte was injected, then at 25° C., a 0.6 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 11

The lithium-ion secondary battery was prepared the same as that in example 1 except the following:

6. Preparation of a lithium-ion secondary battery: the adhesive layer of the binding material was directly adhered at an ending of the wound cell, and then the wound cell was put into a package, the electrolyte was injected, then at 25° C., a 0.8 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 12

The lithium-ion secondary battery was prepared the same as that in example 1 except the following:

5. Preparation of a binding material: a length of the binding material was 75 mm, and a width of the binding material was 11 mm; the adhesive layer was a mixture of polybutylene (PB) and petroleum resin, a thickness of the adhesive layer was 10 μm.

6. Preparation of a lithium-ion secondary battery: the adhesive layer of the binding material was directly adhered at an ending of the wound cell, and then the wound cell was put into a package, the electrolyte was injected, then at 60° C., a 1.5 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 13

The lithium-ion secondary battery was prepared the same as that in example 1 except the following:

5. Preparation of a binding material: a length of the binding material was 75 mm, and a width of the binding material was 11 mm; the adhesive layer was a mixture of SEBS and polystyrene (PS), a thickness of the adhesive layer was 30 μm; the covering layer was PVDF, a thickness of the covering layer was 5 μm.

6. Preparation of a lithium-ion secondary battery: the adhesive layer of the binding material was directly adhered at an ending of the wound cell, and then the wound cell was put into a package, the electrolyte was injected, then at 85° C., a 1 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 14

The lithium-ion secondary battery was prepared the same as that in example 1 except the following:

4. Preparation of a cell: the prepared positive electrode plate, a PP separator and the negative electrode plate were laminated together to form a laminated cell with a thickness of 3.5 mm, a width of 48 mm and a length of 80 mm.

5. Preparation of a binding material: the adhesive layer was a mixture of polyisoprene (PI) and naphthenic oil, a thickness of the adhesive layer was 20 μm.

6. Preparation of a lithium-ion secondary battery: the binding material was adhered at the surface of the laminated cell, and then the cell having the binding material was put into a package, the electrolyte was injected, then at 70° C., a 1 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

EXAMPLE 15

The lithium-ion secondary battery was prepared the same as that in example 1 except the following:

5. Preparation of a Binding Material

1) First binding material: a length of the binding material was 75 mm, and a width of the binding material was 8 mm; the adhesive layer was a mixture of polyisoprene (PI) and naphthenic oil, a thickness of the adhesive layer was 20 μm; the covering layer was PVDF, a thickness of the covering layer was 3 μm.

2) Second binding material: a length of the binding material was 30 mm, and a width of the binding material was 8 mm; the adhesive layer was a mixture of polyisoprene (PI) and naphthenic oil, a thickness of the adhesive layer was 20 μm; the covering layer was PVDF, a thickness of the covering layer was 3 μm.

3) Adhesive tape: the adhesive tape was a green glue tape with a length of 75 mm and a width of 8 mm, the green glue tape comprised polyethylene terephthalate (PET) as the base material and acrylic resin as the adhesive, the acrylic resin was coated on one surface of the polyethylene terephthalate (PET), the thickness of the polyethylene terephthalate (PET) was 7 μm, the thickness of the acrylic resin was 8 μm.

6. Preparation of a lithium-ion secondary battery: the adhesive tape was adhered on the surface of the wound cell where the ending was present, then the adhesive layer of the first binding material was adhered on the corresponding green glue tape which was adhered on the ending of the cell, two second binding materials were adhered respectively on positions perpendicular to the width direction of the cell and across and surrounding the bottom of the cell, one second binding material was adhered on a position perpendicular to the width direction of the cell and across and surrounding the top of the cell, then the cell having the binding material was placed into a package, the electrolyte was injected, then at 70° C., a 1 MPa surface pressure was applied on an outer surfaces of the package of the cell corresponding to positions where the binding material were adhered, to make the adhesive surface of the adhesive layer adhered with the inner surface of the package, finally a lithium-ion secondary battery was completed.

COMPARATIVE EXAMPLE 1

The lithium-ion secondary battery was prepared the same as that in example 1 except the following:

5. Preparation of a binding material: the binding material was a double-sided acrylic resin adhesive tape with a length of 75 mm, a width of 11 mm and a thickness of 20 μm, the double-sided acrylic resin adhesive tape comprised polyethylene terephthalate (PET) as the base material and acrylic resin as the adhesive, the acrylic resin was coated on two surfaces of the polyethylene terephthalate (PET), the thickness of the polyethylene terephthalate (PET) was 6 μm, the thickness of the acrylic resin was 7 μm.

6. Preparation of a lithium-ion secondary battery: the cell having the binding material was put into the package, the electrolyte was injected, then at 25° C., a 1 MPa surface pressure was applied on an outer surface of the package of the cell corresponding to a position where the binding material was adhered, to make the adhesive surface of the adhesive layer adhered with the inner surface of the package, finally a lithium-ion secondary battery was completed.

Next testing processes and testing results of lithium-ion secondary batteries of the present disclosure would be described.

1. Testing of the Drop Test of the Lithium-Ion Secondary Batteries

The lithium-ion secondary battery was fixed into a drop test clamp with a double-sided adhesive tape, the initial voltage of the lithium-ion secondary battery was tested and recorded as $V_0$, the six surfaces of the drop test clamp was sequentially numbered as No. 1, No. 2, No. 3, No. 4, No. 5 and No. 6, and the four corners of the drop test clamp was sequentially numbered as No. C1, No. C2, No. C3 and No. C4.

At 25° C., the drop test clamp was positioned on a test platform with a height of 1.5 m, the lithium-ion secondary battery was dropped sequentially according to Nos. 1-6, then the lithium-ion secondary battery was dropped sequentially according to Nos. C1-C4, six cycles were conducted, then the drop test was completed, after standing for 1 h, the final voltage of the lithium-ion secondary battery was tested and recorded as $V_1$.

(1) The voltage drop of the drop test was recorded as $\Delta V = V_0 - V_1$;

(2) observing whether the package of the lithium-ion secondary battery was damaged or top sealing was burst out;

(3) disassembling the lithium-ion secondary battery apart and observing whether the tabs of the cell were broken;

(4) disassembling the lithium-ion secondary battery apart and observing whether the separator on the two sides along the width direction of the cell was shifted or wrinkled;

(5) disassembling the lithium-ion secondary battery apart and observing whether the positive electrode plate and the negative electrode plate were contacted with each other to establish an internal short circuit;

(6) testing of the maximum adhesive overflow width: the dropped lithium-ion secondary battery sample was disassembled, the package was removed, the maximum adhesive overflow width was measured on the side of the cell having the binding material with a ruler, ten values were recorded along the length direction of the cell, an average value of the ten values was used.

2. Testing of the Cycle Performance of the Lithium-Ion Secondary Batteries

The lithium-ion secondary battery was put into a thermostat oven under 25° C., the lithium-ion secondary battery was charged to 4.35 V at a constant current of 0.5 C, then the lithium-ion secondary battery was charged to 0.025 C at a constant voltage of 4.35 V, then the lithium-ion secondary battery was stood for 3 min, then the lithium-ion secondary battery was discharged to 3.0 V at a constant current of 0.5 C, which was a charge-discharge cycle, the charge-discharge cycle was repeated for 800 times, observing whether there was a short circuit, 50 lithium-ion secondary batteries were tested for each group, and the pass rate of the lithium-ion secondary batteries was calculated.

The initial thickness of the lithium-ion secondary battery before the cycling test was tested and recorded as $D_1$ via a thickness tester, the thickness after 800 cycles was recorded as $D_2$, $D_2/D_1-1$ might represent the deformation rate of the lithium-ion secondary battery, here, if the deformation rate was small than 8%, the lithium-ion secondary battery was identified as without deformation, the pass rate of the lithium-ion secondary batteries without deformation was calculated.

3. Testing of the Cycle Number of the Lithium-Ion Secondary Batteries Discharged Under a High Rate The lithium-ion secondary battery was put into a thermostat oven under 25° C., the lithium-ion secondary battery was charged to 4.35 V at a constant current of 0.7 C, then the lithium-ion secondary battery was charged to 0.025 C at a constant voltage of 4.35 V, then the lithium-ion secondary battery was stood for 3 min, then the lithium-ion secondary battery was discharged to 3.0 V at a constant current of 1 C, which was a charge-discharge cycle, the charge-discharge cycle was repeated until the capacity of the lithium-ion secondary battery decayed to small than 80%, the cycle number was recorded.

4. Testing of the Electrolyte Expansion of the Lithium-Ion Secondary Batteries

After formation and degassing was conducted on the lithium-ion secondary battery, observing whether there was an obvious electrolyte expansion on the exterior of the lithium-ion secondary battery via visual inspection, the number of the lithium-ion secondary batteries without electrolyte expansion was marked as $P_0$, the total number of the lithium-ion secondary batteries to be tested was P, the pass rate of the lithium-ion secondary batteries without electrolyte expansion was $P_0/P$.

Table 1 illustrated parameters of examples 1-15 and comparative example 1

Table 2 illustrated testing results of examples 1-15 and comparative example 1.

TABLE 1

Parameters of examples 1-15 and comparative example 1

| | | | | | binding material | | | | | | | | |
| | | | | | adhesive layer | | | covering layer | | adhesive tape | | temperature | pressure |
| | cell type | position | length mm | width mm | material | inorganic additive | thickness μm | material | thickness μm | material | thickness μm | ° C. | MPa |
|---|---|---|---|---|---|---|---|---|---|---|---|---|---|
| example 1 | wound cell | ending | 75 | 8 | PB terpene resin | / | 20 | PVDF | 3 | / | / | 60 | 1 |
| example 2 | wound cell | ending | 75 | 8 | PB terpene resin | / | 20 | PVDF | 20 | / | / | 60 | 1 |
| example 3 | wound cell | ending | 75 | 8 | PB terpene resin | / | 20 | FPP | 3 | / | / | 60 | 1 |
| example 4 | wound cell | ending | 75 | 8 | PB terpene resin | / | 20 | FPBI | 3 | / | / | 60 | 1 |
| example 5 | wound cell | opposite surface of ending | 75 | 8 | PB terpene resin | / | 20 | FPBI | 3 | / | / | 60 | 1 |
| | | ending | 75 | 8 | green glue tape | / | 15 | / | / | / | / | | |
| example 6 | wound cell | ending | 75 | 8 | PB terpene resin | / | 20 | PVDF | 3 | / | / | 25 | 1 |
| example 7 | wound cell | ending | 75 | 8 | SIS terpene resin | / | 20 | PVDF | 3 | / | / | 85 | 1 |
| example 8 | wound cell | ending | 75 | 8 | SIS terpene resin | $Al_2O_3$ | 40 | PVDF | 3 | / | / | 85 | 1 |
| example 9 | wound cell | ending | 75 | 8 | PB terpene resin | / | 20 | PVDF | 3 | / | / | 25 | 0.2 |
| example 10 | wound cell | ending | 75 | 8 | PB terpene resin | / | 20 | PVDF | 3 | / | / | 25 | 0.6 |
| example 11 | wound cell | ending | 75 | 8 | PB terpene resin | / | 20 | PVDF | 3 | / | / | 25 | 0.8 |

TABLE 1-continued

Parameters of examples 1-15 and comparative example 1

| | cell type | position | length mm | width mm | binding material — adhesive layer material | inorganic additive | thickness μm | covering layer material | thickness μm | adhesive tape material | thickness μm | temperature ° C. | pressure MPa |
|---|---|---|---|---|---|---|---|---|---|---|---|---|---|
| example 12 | wound cell | ending | 75 | 11 | PB petroleum resin | / | 10 | PVDF | 3 | / | / | 60 | 1.5 |
| example 13 | wound cell | ending | 75 | 11 | SEBS PS | / | 30 | PVDF | 5 | / | / | 85 | 1 |
| example 14 | laminated cell | cell surface | 75 | 8 | PI naphthenic oil | / | 20 | PVDF | 3 | / | / | 70 | 1 |
| example 15 | wound cell | ending | 75 | 8 | PI naphthenic oil | / | 20 | PVDF | 3 | green glue | 15 | 70 | 1 |
| | | top bottom | 30 | 8 | PI naphthenic oil | / | 20 | PVDF | 3 | tape | | | |
| comparative example 1 | wound cell | ending | 75 | 11 | double-sided acrylic resin adhesive tape | / | 20 | / | / | / | / | 25 | 1 |

TABLE 2

Testing results of examples 1-15 and comparative example 1

| | maximum adhesive overflow width mm | pass rate of the drop test | | | | | testing of the cycle performance | | the cycle number when discharged under a high rate | pass rate without liquid expansion |
|---|---|---|---|---|---|---|---|---|---|---|
| | | no voltage drop | no package damaged or top sealing burst | no tab broken | no separator shift or wrinkle | no electrode plate internal short circuit | pass rate without short circuit after the cycling test | pass rate without deformation after the cycling test | | |
| example 1 | 2 | 100% | 100% | 100% | 100% | 100% | 100% | 90% | 1000 | 100% |
| example 2 | 2 | 100% | 100% | 100% | 100% | 100% | 100% | 100% | 1000 | 100% |
| example 3 | 2 | 100% | 100% | 100% | 100% | 100% | 100% | 95% | 1000 | 100% |
| example 4 | 2 | 100% | 100% | 100% | 100% | 100% | 100% | 95% | 1000 | 100% |
| example 5 | 2 | 100% | 100% | 100% | 100% | 100% | 100% | 95% | 1000 | 100% |
| example 6 | 1 | 100% | 100% | 100% | 100% | 100% | 100% | 95% | 1000 | 100% |
| example 7 | 2 | 100% | 100% | 100% | 100% | 100% | 100% | 95% | 1000 | 100% |
| example 8 | 1 | 100% | 100% | 100% | 100% | 100% | 100% | 95% | 1000 | 100% |
| example 9 | 0 | 100% | 100% | 100% | 100% | 100% | 100% | 95% | 1000 | 100% |
| example 10 | 1 | 100% | 100% | 100% | 100% | 100% | 100% | 95% | 1000 | 100% |
| example 11 | 1.5 | 100% | 100% | 100% | 100% | 100% | 100% | 95% | 1000 | 100% |
| example 12 | 1 | 100% | 100% | 100% | 100% | 100% | 100% | 95% | 1000 | 100% |
| example 13 | 2 | 100% | 100% | 100% | 100% | 100% | 100% | 100% | 1000 | 100% |
| example 14 | 2 | 100% | 100% | 100% | 100% | 100% | 100% | 95% | 1000 | 100% |
| example 15 | 2 | 100% | 100% | 100% | 100% | 100% | 100% | 95% | 1000 | 100% |
| comparative example 1 | 0 | 5% | 10% | 10% | 2% | 10% | 10% | 60% | 600 | 20% |

It could be seen from a comparison between examples 1-15 and comparative example 1, the lithium-ion secondary battery of the present disclosure had a higher pass rate of the drop test, a higher pass rate without short circuit after the cycling test, a higher pass rate without deformation after the cycling test, and a higher pass rate without liquid expansion, and also the cycle number when discharged under a high rate was higher. This was because comparative example 1 used a normal double-sided acrylic resin adhesive tape, the two surfaces both were adhesive at room temperature, causing the position between the cell adhered with the normal double-sided acrylic resin adhesive tape and the package was difficult to adjust when they were adhered with each other, and also the adhesive strength of the normal double-sided acrylic resin adhesive tape was relatively small, therefore it must increase the width of the normal double-sided acrylic resin adhesive tape in order to achieve a better adhesive strength, so as to increase the adhesive area, and in turn increase the adhesive strength. The covering layer of the present disclosure was a polar molecular, and was easily formed into a network structure, the covering layer might absorb the electrolyte, and when the electrolyte in the lithium-ion secondary battery was gradually decreased as a result of electrolyte decomposition, the electrolyte absorbed by the covering layer could be gradually released under a concentration difference; the covering layer was dissolved or swollen into the electrolyte in whole or in part so as to generate adhesiveness and diffused into the lithium-ion secondary battery along with the electrolyte, thereby making the separator adhered with the electrode plate, preventing the separator from being shrank when the lithium-ion secondary battery was dropped, and without adding additional binding materials which was adhered and positioned at a position of the cell across and surrounding the top and the bottom of the cell; in addition, because the covering layer had a higher molecular polarity, which was beneficial to the ionization of the lithium salt, therefore it could improve the ion-conducting ability of the electrolyte, and improve the charge-discharge performance under a high rate of the lithium-ion secondary battery.

It could be seen from examples 1-2, as the thickness of the covering layer increased, the amount of the covering layer which was dissolved or swollen into the electrolyte increased, the amount of the covering layer which has entered into a position between the positive electrode plate and the negative electrode plate increased, which might enhance the adhesive force between the positive electrode plate and the negative electrode plate, thereby increasing the pass rate without deformation after the cycling test of the lithium-ion secondary batteries.

It could be seen from example 5, the change of the adhered position of the binding material would not affect the performance of the lithium-ion secondary battery.

It could be seen from examples 6-7, when the temperature applied on the lithium-ion secondary battery changed, the performance of the lithium-ion battery would not be changed.

It could be seen from example 8, when the adhesive layer comprised the inorganic additive, although the adhesive layer had a higher thickness, the lithium-ion secondary battery still had a better performance, this was because the inorganic additive might effectively control the adhesiveness of the adhesive layer, prevent the binding material from flowing to the sealing edge of the cell under pressing or heating, resolve the problem of poor sealing which was caused by the inhomogeneous flow of the binding material, modify the adhesive overflow width.

It could be seen from examples 9-11, when the pressure applied on the lithium-ion secondary battery gradually increased, the adhesive overflow width increased.

It could be seen from examples 12-15, adhering and positioning the binding material on the surface of the green glue tape which was adhered at the ending of the cell played an equivalent role as directly adhering and positioning the binding material at the ending of the cell, and when the thickness of the adhesive layer and the thickness of the covering layer increased, it helped to increase the adhesiveness between the cell and the package, thereby improving the pass rate without deformation after the cycling test of the lithium-ion secondary batteries.

What is claimed is:

1. An electrochemical energy storage device, comprising:
   a cell comprising a positive electrode plate, a negative electrode plate and a separator positioned between the positive electrode plate and the negative electrode plate;
   an electrolyte immersing the cell; and
   a package accommodating the cell and the electrolyte;
   the electrochemical energy storage device further comprising:
   a binding material positioned between the cell and the package, comprising:
   an adhesive layer directly or indirectly adhered and positioned on an outer surface of the cell; and
   a covering layer positioned between the adhesive layer and the package, the covering layer being configured to be dissolved or swollen into the electrolyte in whole or in part so as to expose the adhesive layer, the adhesive layer in turn making the cell adhered with the package;
   the covering layer being a polar molecule, and the covering layer being one or more selected from the group consisting of polar fluorinated polyester, polar fluororubber, polyamide and fluorinated polyurethane;
   the polar fluorinated polyester is one or more selected from the group consisting of linear fluorinated poly(butylene isophthalate), linear fluorinated poly(butylene terephthalate), hydroxyl terminated polyester polysiloxane containing fluorine, and hyperbranched polyhydroxy fluorinated polyester;
   the polar fluororubber is one or more selected from the group consisting of hydroxyl nitroso fluororubber, and fluoro ether rubber;
   the polyamide is one or more selected from the group consisting of polydecamethylene sebacamide, polyundecanamide, and polydodecanamide.

2. The electrochemical energy storage device according to claim 1, wherein the fluorinated polyurethane is generated by the reaction of polyhydric alcohol containing double bond, diisocyanate and chain extension agent.

3. The electrochemical energy storage device according to claim 2, wherein the polyhydric alcohol containing double bond is one or more selected from the group consisting of poly hexalene glycol, poly propylene glycol, polytetramethylene ether glycol, and polycaprolactone oxydiethylene ester.

4. The electrochemical energy storage device according to claim 2, wherein the diisocyanate is one or more selected from the group consisting of diphenyl-methane-diisocyanate, lysine diisocyanate, 4,4'-methylene dicyclohexyl diisocyanate, and 2,4,6-triisopropylphenyl diisocyanate.

5. The electrochemical energy storage device according to claim 2, wherein the chain extension agent is one or more selected from the group consisting of 1,6-hexanediamine, 1,4-butylenediamine, 1,2-diaminopropane, and bis(aminomethyl)benzene.

6. The electrochemical energy storage device according to claim 1, wherein the adhesive layer is one or more selected from the group consisting of temperature sensitive adhesive and pressure sensitive adhesive.

7. The electrochemical energy storage device according to claim 6, wherein the temperature sensitive adhesive is one or more selected from the group consisting of terpene resin, petroleum resin, polyolefin, polyvinyl butyral, polyamide, ethylene-vinyl acetate copolymer, styrene-isoprene-styrene block copolymer, and polyester; or the temperature sensitive adhesive is a mixture of naphthenic oil and one or more selected from the group consisting of terpene resin, petroleum resin, polyolefin, polyvinyl butyral, polyamide, ethylene-vinyl acetate copolymer, styrene-isoprene-styrene block copolymer, and polyester.

8. The electrochemical energy storage device according to claim 6, wherein the pressure sensitive adhesive is one or more selected from the group consisting of ethylene-butylene-styrene linear triblock copolymer, styrene-butadiene block copolymer, epoxidized styrene-isoprene-styrene block copolymer, acrylic resin adhesive, thermosetting polyurethane adhesive, silicone adhesive, natural rubber and synthetic rubber.

9. The electrochemical energy storage device according to claim 1, wherein the adhesive layer further comprises an inorganic additive, the inorganic additive is one or more selected from the group consisting of $Al_2O_3$ and $SiO_2$.

10. The electrochemical energy storage device according to claim 1, wherein the electrochemical energy storage device further comprises an adhesive tape having single adhesive surface or double adhesive surfaces, positioned between the cell and the binding material, one adhesive surface of the adhesive tape is adhered and positioned on the outer surface of the cell and the other surface of the adhesive tape is adhered and connected to the binding material so as to make the binding material indirectly adhered and positioned on the outer surface of the cell.

11. The electrochemical energy storage device according to claim 10, wherein a base material of the adhesive tape is one or more selected from the group consisting of polyethylene terephthalate, oriented polypropylene and polyimide.

12. The electrochemical energy storage device according to claim 10, wherein an adhesive of the adhesive tape is one or more-selected from the group consisting of acrylic resin adhesive, thermosetting polyurethane adhesive, silicone adhesive, natural rubber and synthetic rubber.

* * * * *